Feb. 13, 1945.   E. WAEBER   2,369,500
PISTON COOLING
Filed Dec. 22, 1941
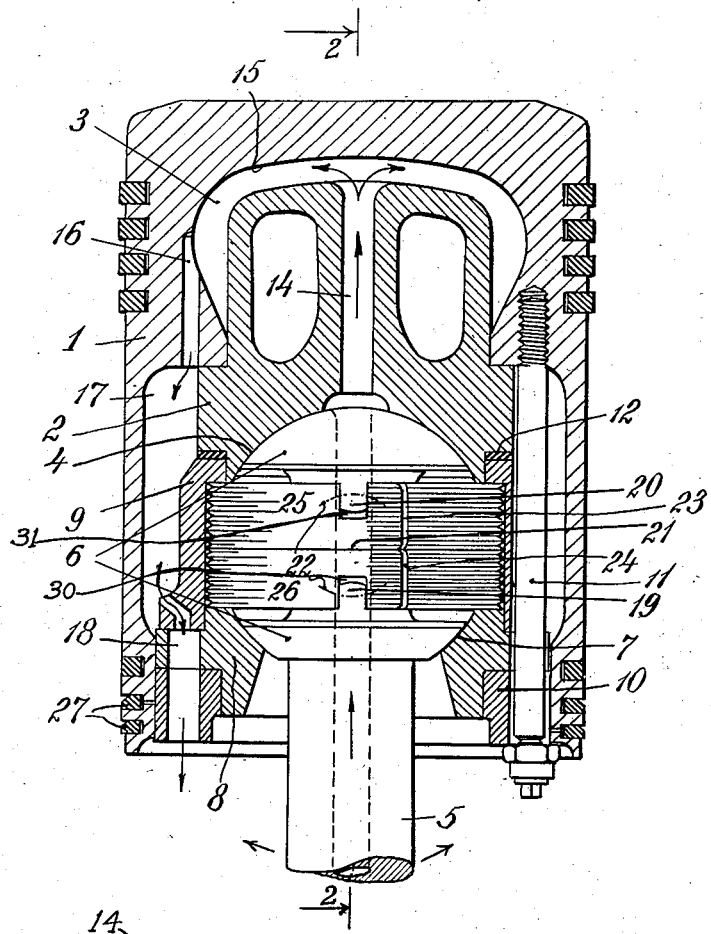
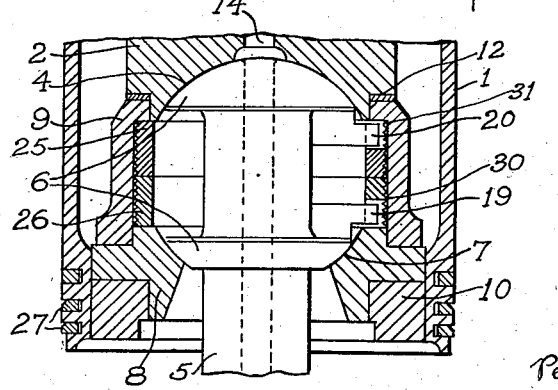
INVENTOR
Erwin Waeber
BY
Pennie, Davis, Marvin and Edmonds
ATTORNEYS Patented Feb. 13, 1945

2,369,500

UNITED STATES PATENT OFFICE 2,369,500

PISTON COOLING

Erwin Waeber, Winterthur, Switzerland, assignor to Sulzer Frères, Société Anonyme, Winterthur, Switzerland Application December 22, 1941, Serial No. 423,958
In Switzerland February 1, 1941

2 Claims. (Cl. 123—176)

This invention relates to an improved piston for an internal combustion engine of the type which is rotatable in the engine cylinder. The improved rotatable piston of the invention comprises means for passing cooling oil through the connecting rod, then through a space in the piston into contact with a cooling surface of the piston, with duct means for returning the oil from the said space to the crank case of the engine, and at least one oil scraper ring on the piston. The oil which is forced through the connecting rod into contact with the inner surface of the piston is permitted to flow freely back into the crank case of the engine.

Liquid-cooled pistons give rise to difficulties in delivering oil to a quickly moving piston from a stationary place through hydraulically-tight devices and in returning the oil to the stationary place through other hydraulically-tight devices. If a suitable oil is used for the cooling, losses through leakage at the hydraulically-tight devices may be permitted. But if, as in the invention, one of the hydraulically-tight devices is altogether omitted in order to simplify the piston, and the oil heated on the piston cooling-surfaces is ejected direct into the crank case, it is possible that the loss of oil may become impermissibly great. The piston, heavily sprayed with oil, will allow—particularly after a long period of working—the oil to pass into the combustion space, where it is burnt and therefore lost for lubricating purposes. If, as proposed by the invention, the piston is fitted with a device which superimposes a rotary motion on the reciprocating motion of the piston, the piston in the course of service will become always more gastight in the cylinder in consequence of the grinding action of these combined movements. Grooving can no longer take place, so that an absolutely reliable oil-cooling, with the oil for simplicity ejected direct into the crank case, is ensured without any impermissible losses of oil.

It is preferable to adopt the lubricating oil of the connecting-rod joint in the piston as cooling-oil. This cooling-oil can suitably be introduced through the connecting rod. Further simplification of the piston is obtained if the cooling-oil is ejected in a free jet from the connecting rod into the piston.

The accompanying drawing illustrates an improved piston for an internal combustion engine embodying the invention, in which:

Fig. 1 is a sectional side view of the piston, and

Fig. 2 is a fragmentary sectional view along the line 2—2 of Fig. 1.

The piston 1 has within its head and skirt a core member 2, which forms at one side with the piston crown the boundary of the cooling-space 3 within the piston, and has at the other side a semi-spherical bearing surface 4 for the ball-head 6 of the connecting rod 5. The annular member 10, the closing member 8 which is provided with a semi-spherical bearing surface 7, the intermediate piece 9 which acts as a connecting drum, the core member 2 and the piston body 1 are held together by a number of bolts 11. In order to be able to maintain the proper running clearance between the ball head 6, the connecting rod 5 and the ball cups 4 of the core member 2 and the closing member 8, shims 12 are provided between the core member 2 and the connecting drum 9.

Through the bore 13 lubricating oil is introduced to the bearing surfaces 4 and 7. The bore 13 connects to a bore 14 in the core member 2, and through this latter a part of the lubricating oil passes as cooling-oil into the cooling-space 3. After passing over the cooling-surface 15 of the piston body 1 the heated cooling-oil flows through a number of bores 16 into the annular space 17 and is then ejected through a number of further bores 18 into the crank case under the piston of the internal combustion engine.

The ball-head 6 has fitted thereover, in an annular groove, two spring rings 25 and 26 which are each slit at 23 and 24 respectively. The exterior grooved surfaces of the spring rings are normally in pressing engagement with the inner cylindrical surface of the annular intermediate member 9. The lugs 19 and 20 of the ball-head fit rather loosely in slots 30 and 31 respectively. When the piston reciprocates, the connecting rod 5 swings in the direction of the arrows with point 21 as a center of rotation. The lugs 19 and 20 each oscillate in the slots 30 and 31 as shown by the arcs 22.

When the connecting rod 5 swings toward the left, the lug 20 swings toward the right and this forces the split ring 25 towards the right, closing the slit 23, thereby decreasing the diameter of ring 25, releasing it from engagement with member 9. At the same time, the lug 19 swings toward the left and expands the ring 26, thus increasing its frictional engagement with the member 9, thereby causing the piston to rotate in a clockwise direction as viewed from above. When the connecting rod 5 swings toward the right, the lug 20 swings toward the left expanding the ring 25 into gripping engagement with the member 9 and the lug 19 swings toward the right, decreasing the diameter of the ring 26, thereby releasing it from gripping engagement with the member 9. This also results in a clockwise rotation of the piston. In other words, the piston is rotated in tiny increments continuously in one direction by the swinging movement of the connecting rod. By this rotating and reciprocating motion the oil scraper rings 27 and the cylinder surface will become polished in the course of service, and the formation of grooves will be prevented. Both at the oil scraping rings and at the cylinder, hard highly-polished sliding surfaces will be formed, which will prevent oil flowing through from the crank case into the combustion space.

Only by obtaining hydraulic tightness with the help of the grinding motion of the piston, will it be possible without excessive losses to maintain reliably a simple form of oil-cooling with ejection of the cooling-oil.

I claim:

1. A rotatable piston comprising an integral head and skirt for a ball-head connecting rod which comprises bearing means inside the piston for engaging the ball-head, a pair of spring rings inside the piston, means for expanding and contracting each ring alternately by the swinging action of the connecting rod to rotate the piston in small increments in one direction, one ring moving the piston when the rod swings in one direction and the other ring moving the piston in the same direction when the connecting rod swings in the other direction, and at least one oil scraper ring mounted in the skirt of the piston.

2. An improved piston comprising an integral head and skirt for an internal combustion engine which comprises two spring rings inside the piston for alternately gripping and rotating the piston about its axis due to the swinging motion of the piston connecting rod, means for passing a cooling oil into contact with a cooling surface on the inside of the piston, duct means in the piston for flowing the oil away from the cooling surface and out of the piston, and at least one oil scraper ring for the piston in the lower portion of the piston skirt.

ERWIN WAEBER.